(No Model.)
F. W. BARCAFER.
SECTIONAL HORSESHOE.
No. 560,564. Patented May 19, 1896.
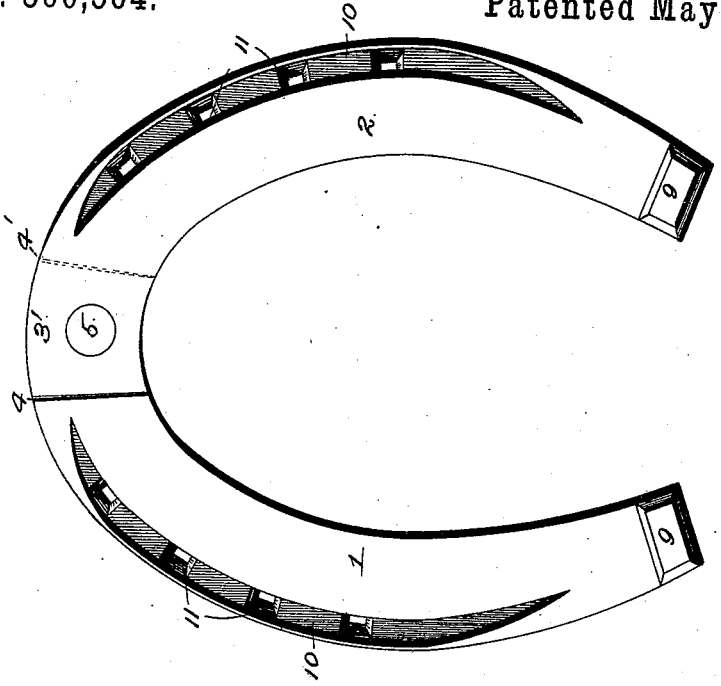
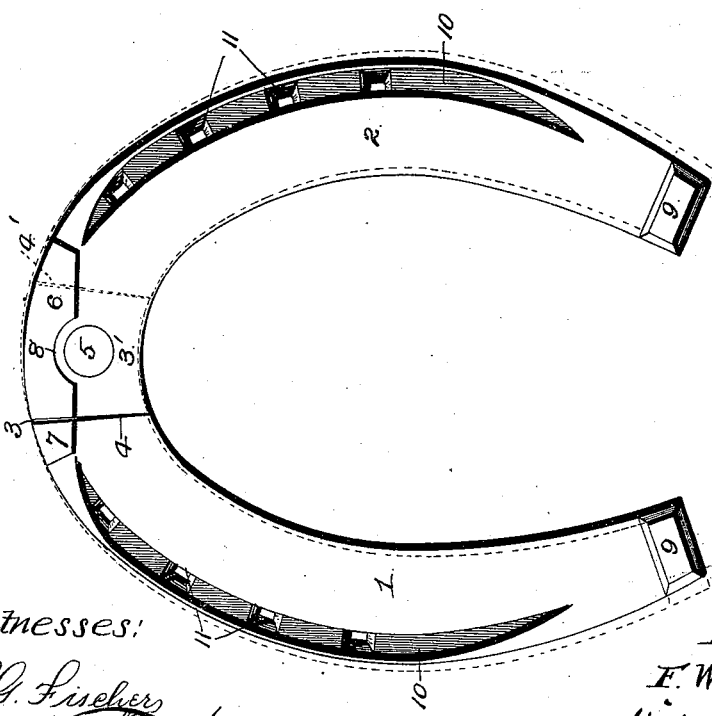
Witnesses:
F. G. Fischer
G. W. Thorpe
Inventor:
F. W. Barcafer
By Higdon & Higdon
Attys.

UNITED STATES PATENT OFFICE.

FRANCIS W. BARCAFER, OF KANSAS CITY, MISSOURI.

SECTIONAL HORSESHOE.

SPECIFICATION forming part of Letters Patent No. 560,564, dated May 19, 1896.

Application filed September 3, 1895. Serial No. 561,366. (No model.)

*To all whom it may concern:*

Be it known that I, FRANCIS W. BARCAFER, of Kansas City, Jackson county, Missouri, have invented certain new and useful Improvements in Horseshoes, of which the following is a full, clear, and exact description, reference being had to the accompanying drawings, forming a part hereof.

My invention relates to animal shoes, and has for its object to produce a shoe which will permit the hoof of the animal to expand and contract without binding, that the hoof may thereby escape injury by cracking or splitting.

A further object of the invention is to produce a shoe of this character which is simple, strong, durable, and inexpensive of construction.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents an inverted plan view of a horseshoe embodying my invention. Fig. 2 represents a front view of the same. Fig. 3 represents an inverted plan view of a slightly-modified form of my invention.

In the said drawings, 1 and 2 designate the sections which jointly form my improved horseshoe. At their front ends, in order that their upper and lower surfaces shall lie in the same planes, I step or halve them together. To accomplish this, the section 1 is provided with the tongue 3 and the underlying groove or recess 4. The section 2 at its adjacent end is formed with a similar tongue 3' and above the same with groove or recess 4'. When the sections are fitted together, the tongue of each fits snugly within the groove of the other, and this relation between said parts is made permanent by means of the vertical pivot 5. Depending from the tongue 3' of the section 2 and extending laterally beyond the joint between the superposed groove and tongue is one section 6 of the toe-calk of the shoe, and depending vertically from the section 1 outward of the joint between its recess and the engaged tongue 3 is the other section 7 of the toe-calk. The longer section 6, which extends laterally beyond both sides of the pivot, is preferably formed upon its rear face with the segmental recess 8, that access to the pivot may be easily had. The relation between the sections of the shoe is such that a slight and almost imperceptible movement is provided to accommodate the expansion and contraction of the the animal's hoof. Said expansive and contractive action of the shoe is limited by the engagement of the ends of the tongues with the opposing sections of the shoe. At their rear ends said sections are provided with the usual heel-calks 9 and at their outer margins with the grooves 10, with which register the nail-holes 11.

By reference to Fig. 3 it will be noticed that the toe-calk is dispensed with and that in all other respects the construction is precisely similar to that already described.

The shoe illustrated in Figs. 1 and 2 will be employed upon draft-animals and upon others when the condition of the streets requires it, particularly in winter.

From the foregoing it will be apparent that I have produced a horseshoe embodying the desirable features enumerated in the statement of invention. The strength of the shoe is not diminished materially, if at all, by making it in sections and stepping them together, owing to the fact that the toe-calk has a bearing upon the ground which extends laterally beyond each end of said joint, as illustrated most clearly in Fig. 2.

Having thus described my invention, what I claim as new, and desire to secure by Letters Patent, is—

A horseshoe, comprising a number of sections each formed with a tongue and groove or recess at its front end, the tongue of one section entering the groove or recess of the opposing section, a pivot extending through said tongues, a toe-calk depending from the front end of the shoe and consisting of two parts, one integral with each section, and heel-calks also depending from said sections, substantially as shown and described.

In testimony whereof I affix my signature in presence of two witnesses.

FRANCIS W. BARCAFER.

Witnesses:
 M. PEARL LOWE,
 G. Y. THORPE.